United States Patent
Seki et al.

(10) Patent No.: US 11,436,322 B2
(45) Date of Patent: Sep. 6, 2022

(54) VEHICLE UNAUTHORIZED ACCESS COUNTERMEASURE TAKING APPARATUS AND VEHICLE UNAUTHORIZED ACCESS COUNTERMEASURE TAKING METHOD

(71) Applicant: HITACHI, LTD., Tokyo (JP)

(72) Inventors: Kota Seki, Tokyo (JP); Kota Ideguchi, Tokyo (JP); Nobuyoshi Morita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 572 days.

(21) Appl. No.: 16/522,143

(22) Filed: Jul. 25, 2019

(65) Prior Publication Data

US 2020/0034531 A1    Jan. 30, 2020

(30) Foreign Application Priority Data

Jul. 25, 2018 (JP) .............................. JP2018-139464

(51) Int. Cl.
*G06F 21/55* (2013.01)
*G07C 5/00* (2006.01)
*B60R 25/24* (2013.01)

(52) U.S. Cl.
CPC .......... *G06F 21/554* (2013.01); *B60R 25/241* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 11,063,970 B2* | 7/2021 | Hartkopp | H04L 12/40 |
| 2008/0165046 A1* | 7/2008 | Fullerton | G01S 7/003 |
| | | | 342/21 |
| 2018/0295147 A1 | 10/2018 | Haga et al. | |
| 2018/0316584 A1* | 11/2018 | Ujiie | H04L 41/145 |

(Continued)

FOREIGN PATENT DOCUMENTS

| | | |
|---|---|---|
| JP | 2017-111796 A | 6/2017 |
| JP | 2018-005282 A | 1/2018 |

*Primary Examiner* — Kaveh Abrishamkar
(74) *Attorney, Agent, or Firm* — Baker Botts L.L.P.

(57) ABSTRACT

An unauthorized access to a vehicle is accurately detected. An attack detection rule generation server includes: a general unauthorized access information receiving section receiving, from an external information processing apparatus, general unauthorized access information about an unauthorized access made to an information processing apparatus; a vehicle unauthorized access characteristic information generation section generating vehicle unauthorized access characteristic information about characteristics of an unauthorized access to a vehicle in a case of comparing the unauthorized access to the vehicle with the unauthorized access to the information processing apparatus; a vehicle unauthorized access information generation section generating vehicle unauthorized access information indicating a configuration of the unauthorized access to the vehicle, on the basis of the general unauthorized access information and the vehicle unauthorized access characteristic information; and a vehicle unauthorized access detection rule generation section generating a vehicle unauthorized access detection rule detecting the unauthorized access to the vehicle, on the basis of the vehicle unauthorized access information.

12 Claims, 13 Drawing Sheets

(56) References Cited

U.S. PATENT DOCUMENTS

| | | | |
|---|---|---|---|
| 2019/0191311 A1* | 6/2019 | O'Brien | H04W 12/122 |
| 2020/0028875 A1* | 1/2020 | Rogel | H04B 17/336 |
| 2020/0120509 A1* | 4/2020 | Stitt | G07C 9/28 |

* cited by examiner

FIG.3

IT SYSTEM CHARACTERISTIC DB　　240

| CATEGORY | ITEM | CHARACTERISTIC |
|---|---|---|
| DIFFERENCE IN SYSTEM | MOBILITY | FIXED |
| DIFFERENCE IN APPARATUS | COMMUNICATION FORM | WIRED COMMUNICATION AND WIRELESS COMMUNICATION |
| DIFFERENCE IN OBJECT | LARGE NUMBER OF OBJECTS TO BE MONITORED | ONE SPECIFIC OBJECT |
| ⋮ | ⋮ | ⋮ |

AUTOMOTIVE CHARACTERISTIC DB　　250

| CATEGORY | ITEM | CHARACTERISTIC |
|---|---|---|
| DIFFERENCE IN SYSTEM | MOBILITY | MOBILE |
| DIFFERENCE IN APPARATUS | COMMUNICATION FORM | WIRELESS COMMUNICATION |
| DIFFERENCE IN OBJECT | LARGE NUMBER OF OBJECTS TO BE MONITORED | A PLURALITY OF OBJECTS WITH SAME CONFIGURATION |
| ⋮ | ⋮ | ⋮ |

IT SYSTEM ATTACK BEHAVIOR DB 220

| ATTACK BEHAVIOR ID (2001) | BEHAVIOR CONTENT (2002) |
|---|---|
| I4001 | PERFORM SCANNING TO LOCATE APPARATUS SUBJECTED TO ATTACK |
| I4002 | CHANGE AUTHENTICATION INFORMATION TO MAKE ACCESS A PLURALITY OF TIMES |
| ⋮ | ⋮ |

FIG.6

AUTOMOTIVE BEHAVIOR ELEMENT DB 260

| ELEMENT ID (2401) | COMPARISON ITEM (2402) | BEHAVIOR ELEMENT (2403) | ATTACK PHASE (2404) | 5W ELEMENT (2405) | BEFORE-CHANGE CONTENT (2406) | AFTER-CHANGE CONTENT (2407) |
|---|---|---|---|---|---|---|
| E1234 | LARGE NUMBER OF OBJECTS TO BE MONITORED | ATTACK ON A PLURALITY OF VEHICLES WITH SAME CONFIGURATION | INTRUSION | What | ONE SPECIFIC APPARATUS | A PLURALITY OF VEHICLES WITH SAME CONFIGURATION |
| | | | | How many | ATTACK MULTIPLE TIMES | ATTACK ON EACH OF VEHICLES SMALL NUMBER OF TIMES |
| E1235 | LARGE NUMBER OF OBJECTS TO BE MONITORED | ATTACK ON A PLURALITY OF VEHICLES WITH SAME CONFIGURATION | PURPOSE CARRYING-OUT | What | ONE SPECIFIC APPARATUS | A PLURALITY OF VEHICLES WITH SAME CONFIGURATION |
| | | | | How many | TRANSMIT UNAUTHORIZED DATA AS NEEDED | SIMULTANEOUSLY TRANSMIT UNAUTHORIZED DATA TO ALL OBJECTS |
| ⋮ | ⋮ | | | | | |

FIG.7

AUTOMOTIVE ATTACK BEHAVIOR DB   230

| ATTACK BEHAVIOR ID | BEHAVIOR CONTENT |
|---|---|
| G2001 | USE VEHICLE TO VEHICLE COMMUNICATION AND LOCATE VEHICLE TO BE ATTACKED WHILE MAKING PHYSICAL MOVEMENT |
| G2002 | ACCESS EACH OF A PLURALITY OF VEHICLES WITH SAME CONFIGURATION SMALL NUMBER OF TIMES WHILE CHANGING AUTHENTICATION INFORMATION |
| ⋮ | ⋮ |

2101 — ATTACK BEHAVIOR ID
2102 — BEHAVIOR CONTENT

FIG.11

ATTACK DETECTION RULE DB 330

| RULE ID | RULE CONTENT | THRESHOLD |
|---|---|---|
| abc123 | RECEIVE, FROM A PLURALITY OF VEHICLES, AUTHENTICATION ERROR FROM SAME ADDRESS SOURCE | 10 TIMES/MINUTE |
| abc456 | RECEIVE UNAUTHORIZED DATA ALERT FROM A PLURALITY OF VEHICLES WITHIN CERTAIN LOCAL AREA | 10 TIMES/MINUTE |
| ⋮ | ⋮ | ⋮ |

AUTOMOTIVE LOG DB                                      320

| TIME STAMP (2501) | DETAILED LOG INFORMATION (2502) |
|---|---|
| 2017/08/01 12:20:26.158 | rupdata 123.456.789.123 |
| 2017/08/01 12:20:47.864 | autoexnt upfile |
| ⋮ | ⋮ |

FIG.14

ALERT DB                                                340

| ALERT ID (2701) | OCCURRENCE TIME (2702) | ALERT CONTENT (2703) |
|---|---|---|
| abc123 | 12:23:15.123 | RECEIVED, FROM A PLURALITY OF VEHICLES, AUTHENTICATION ERROR FROM SAME ADDRESS SOURCE |
| abc456 | 12:23:18.456 | RECEIVED UNAUTHORIZED DATA ALERT FROM A PLURALITY OF VEHICLES WITHIN CERTAIN LOCAL AREA |
| ⋮ | ⋮ | ⋮ |

VEHICLE UNAUTHORIZED ACCESS COUNTERMEASURE TAKING APPARATUS AND VEHICLE UNAUTHORIZED ACCESS COUNTERMEASURE TAKING METHOD

RELATED APPLICATION

This application claims the benefit of priority to Japanese Patent Application number 2018-139464, filed Jul. 25, 2018, hereby incorporated by reference in its entirety.

BACKGROUND OF THE INVENTION

1. Field of the Invention

The present invention relates to a vehicle unauthorized access countermeasure taking apparatus and a vehicle unauthorized access countermeasure taking method.

2. Description of the Related Art

Mounting of an automatic driving function and dissemination of remote update of the software therefor raise a probability that an automobile is targeted by a cyber attack. While it is conceivable that security countermeasures such as data encryption or access authentication are implemented in the automobile in advance to address the problem, a case in which some cyber attacks sneak through the countermeasures and damage the automobile is also supposed. Under these circumstances, therefore, post-security countermeasures, for example, one that a center which monitors the automobile promptly detects a cyber attack and appropriately takes countermeasures against the cyber attack when the automobile is subjected to the cyber attack by collecting or analyzing logs generated by the automobile in real time have been taken into consideration.

However, the automobile has a configuration different from that of a general information technology (IT) apparatus, and software mounted in the automobile, therefore, differs from that mounted in the IT apparatus. Owing to this, under the present condition, know-hows such as rule setting and security policy setting for detecting cyber attack on automobiles have been accumulated only insufficiently.

As regards a method of accumulating the rule setting and security policy, JP-2018-005282-A, for example, discloses a technique in which comparing data about attack behavior by an attacker collected from external information agency with data about an actual attacker's behavior considered possible from logs of a monitoring terminal, thereby creating a rule or a security policy for detecting a behavior about which the behavioral data matches the former behavioral data.

Furthermore, JP-2017-111796-A discloses a technique in which using contents of logs of the same type collected from a plurality of vehicles to be monitored and calculating an anomaly value of a newly collected log of the same type, thereby determining whether an unauthorized attacker is carrying out a cyber attack.

SUMMARY OF THE INVENTION

However, as regards JP-2018-005282-A, there is no information agency that discloses attack behaviors targeted at automobiles and it is difficult to collect attack behaviors intended at automobiles. It is also difficult to predict an attacker's behavior from past attacks because of a small number of cases of cyber attacks on automobiles.

Moreover, JP-2017-111796-A discloses a configuration of detecting an attack from the anomaly value of a controller area network (CAN) frame; however, it is difficult to detect an attack behavior on a target such as a communication unit that uses an Ethernet frame. Furthermore, it is also difficult to detect an attack that may fall within a normal value and it is considered that detection accuracy is not high.

The present invention has been achieved in the light of these circumstances, and an object of the present invention is to provide a vehicle unauthorized access countermeasure taking apparatus and a vehicle unauthorized access countermeasure taking method capable of accurately detecting an unauthorized access to a vehicle.

To attain the object, a vehicle unauthorized access countermeasure taking apparatus according to one aspect of the present invention includes: a general unauthorized access information receiving section that receives, from a predetermined terminal, general unauthorized access information that is information about an unauthorized access made to a predetermined information processing apparatus; a vehicle unauthorized access characteristic information generation section that generates vehicle unauthorized access characteristic information that is information about characteristics of an unauthorized access to a vehicle in a case of comparing the unauthorized access to the vehicle with the unauthorized access to the information processing apparatus; a vehicle unauthorized access information generation section that generates vehicle unauthorized access information that is information indicating a configuration of the unauthorized access to the vehicle on a basis of the received general unauthorized access information and the generated vehicle unauthorized access characteristic information; and a vehicle unauthorized access detection rule generation section that generates a vehicle unauthorized access detection rule that is information for detecting the unauthorized access to the vehicle on the basis of the generated vehicle unauthorized access information.

According to the present invention, it is possible to accurately detect an unauthorized access to a vehicle.

Other objects disclosed in the present application and methods of achieving the objects are readily apparent from a section of an embodiment and drawings.

BRIEF DESCRIPTION OF THE DRAWINGS

FIG. 3 depicts an example of an IT system characteristic DB;

FIG. 4 depicts an example of an automotive characteristic DB;

FIG. 5 depicts an example of an IT system attack behavior DB;

FIG. 6 depicts an example of an automotive behavior element DB;

FIG. 7 depicts an example of an automotive attack behavior DB;

FIG. 11 depicts an example of an attack detection rule DB;

FIG. 13 depicts an example of an automotive log DB;

FIG. 14 depicts an example of an alert DB;

DESCRIPTION OF THE PREFERRED EMBODIMENTS

Figure 1:
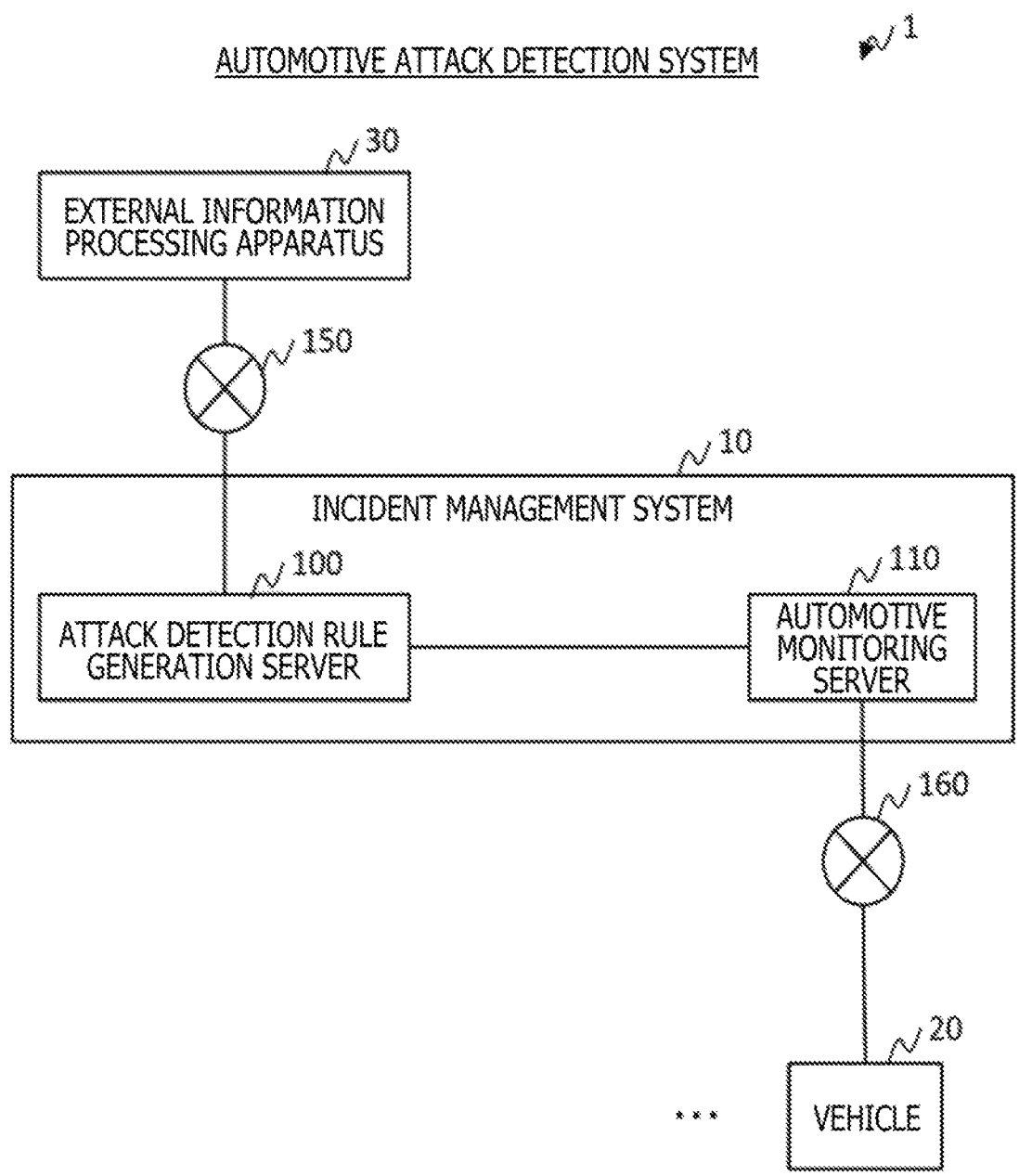
FIG. 1 depicts an example of a configuration of an automotive attack detection system according to an embodiment.

An embodiment of the present invention will be described hereinafter with reference to the drawings. It is noted that common configurations are denoted by same reference characters in the drawings.

<<System Configuration>>

FIG. 1 depicts an example of an automotive attack detection system according to the present embodiment. An automotive attack detection system 1 is configured with an incident management system 10, at least one vehicle 20, and an external information processing apparatus 30.

The vehicle 20 is, for example, a passenger vehicle equipped with a power train function, a steering function, a body function, and the like. Programs that realize these functions in the vehicle 20 are possibly subjected to an unauthorized access (a cyber attack).

The external information processing apparatus 30 is an information processing apparatus that discloses security vulnerability information or security information such as cyber attack information discovered by various vendors and research departments and related to information processing apparatuses (computers) and information systems (information technology (IT) systems) and that is managed by a predetermined agency. The external information processing apparatus 30 stores information about histories of various past unauthorized accesses (hereinafter, referred to as "general unauthorized access information") made to these computers and IT systems.

The incident management system 10 is provided in a facility or the like of a predetermined business operator that monitors an unauthorized access to the vehicle 20. The incident management system 10 includes an attack detection rule generation server 100 (a vehicle unauthorized access countermeasure taking apparatus), and an automotive monitoring server 110.

The attack detection rule generation server 100 generates information about an unauthorized access to the vehicle 20 (hereinafter, referred to as "vehicle unauthorized access information"). In addition, the attack detection rule generation server 100 generates information for detecting an unauthorized access to the vehicle 20 (hereinafter, referred to as "automotive attack detection rule") on the basis of the vehicle unauthorized access information and the general unauthorized access information that is acquired from the external information processing apparatus 30.

The automotive monitoring server 110 collects information about a history of unauthorized accesses made to the vehicle 20 (hereinafter, referred to as "automotive log") from the vehicle 20, and detects a cyber attack on the vehicle 20 on the basis of the collected automotive log and the automotive attack detection rule that is received from the attack detection rule generation server 100.

It is noted that the attack detection rule generation server 100 and the external information processing apparatus 30 are communicably connected to each other via a communication network 150, and the automotive monitoring server 110 and the vehicle 20 are communicably connected to each other via a communication network 160. It is noted that the communication network 150 is, for example, a fixed communication network such as a fiber to the home (FTTH) network. Furthermore, the communication network 160 is, for example, a public mobile communication network such as a 3G/long term evolution (LTE) network, a wide area network (WAN), or a local area network (LAN).

The attack detection rule generation server 100 will next be described in detail.

<Attack Detection Rule Generation Server>

Figure 2:
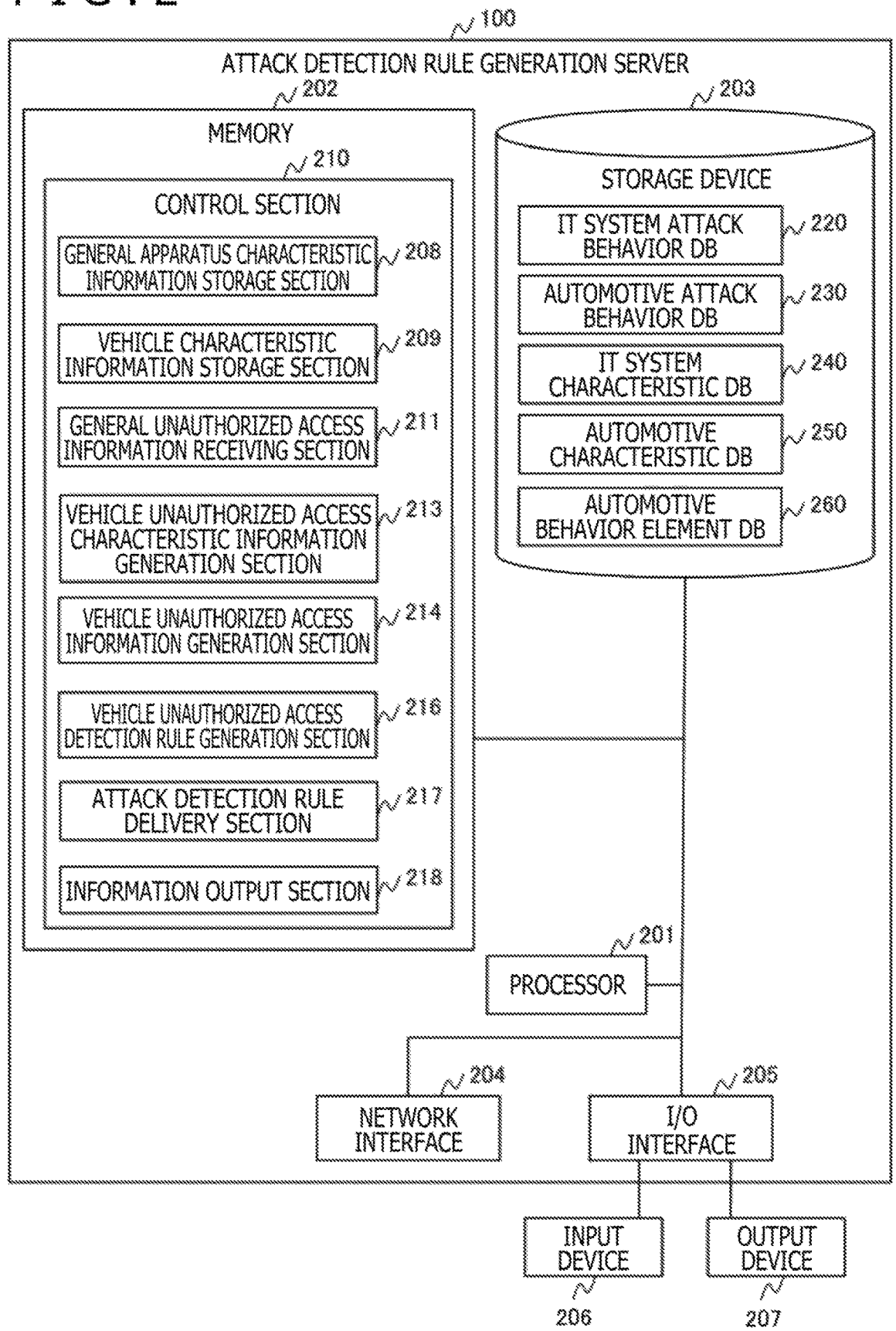
FIG. 2 depicts an example of hardware and functions provided in an attack detection rule generation server.

FIG. 2 depicts an example of hardware and functions provided in the attack detection rule generation server 100. The attack detection rule generation server 100 includes, as hardware, a processor 201 such as a central processing unit (CPU), a memory 202 such as a random access memory (RAM) or a read only memory (ROM), a storage device 203 such as a hard disk drive (HDD) or a solid state drive (SSD), a network interface 204, and an input/output (I/O) interface 205 that is an interface for connecting the attack detection rule generation server 100 to external devices such as input devices 206 and output devices 207 to be described later, and these constituent elements are connected to one another via a bus or the like that is not depicted. Furthermore, the input devices 206 such as a keyboard, a mouse, and a touch panel and the output devices 207 such as a display and a touch panel are connected to the attack detection rule generation server 100.

The attack detection rule generation server 100 is also configured with functions including a control section 210 that controls a process performed by the attack detection rule generation server 100, a general apparatus characteristic information storage section 208, a vehicle characteristic information storage section 209, a general unauthorized access information receiving section 211, a vehicle unauthorized access characteristic information generation section 213, a vehicle unauthorized access information generation section 214, a vehicle unauthorized access detection rule generation section 216, an attack detection rule delivery section 217, and an information output section 218.

The general apparatus characteristic information storage section 208 stores general apparatus characteristic information that is information indicating characteristics of an information processing apparatus. The general apparatus characteristic information is stored in an IT system characteristic DB 240.

(IT System Characteristic DB)

Here, FIG. 3 depicts an example of the IT system characteristic DB 240. The IT system characteristic DB 240 is configured with one or more records each having columns including: a category 2201 in which information about a preset category (for example, a combination of an information system configuration, an apparatus configuration, and a participator) related to the characteristics of the information processing apparatus is stored; an item 2202 in which an item (for example, a mobility, the number of objects to be monitored; and a communication form) in the category is stored, and a characteristic 2203 in which information indicating a content of the characteristics of the information processing apparatus corresponding to the item 2202 (general apparatus characteristic information) is stored. It is noted that the IT system characteristic DB 240 is created by, for example, inputting each piece of the information by a manager or the like (hereinafter, simply referred to as "manager") of the incident management system 10.

With reference back to FIG. 2, the vehicle characteristic information storage section 209 stores vehicle characteristic information that is information indicating characteristics of the vehicle 20. The vehicle characteristic information is stored in an automotive characteristic DB 250.

(Automotive Characteristic DB)

Here, FIG. 4 depicts an example of the automotive characteristic DB 250. The automotive characteristic DB 250 is configured with one or more records each having columns including: a category 2301 in which information about a preset category (for example, a combination of an information system configuration, an apparatus configuration, and a participator) related to the characteristics of the vehicle 20 is stored; an item 2302 in which an item (for example, a mobility, the number of objects to be monitored, a communication form) in the category is stored; and a characteristic 2303 in which information indicating a content of the characteristics of the vehicle 20 corresponding to the item 2302 is stored. It is noted that the automotive characteristic DB 250 is created by, for example, inputting each piece of the information by the manager.

With reference back to FIG. 2, the general unauthorized access information receiving section 211 receives general unauthorized access information that is information about an unauthorized access made to a predetermined information processing apparatus from the external information processing apparatus 30. The general unauthorized access information is stored in an IT system attack behavior DB 220.

(IT System Attack Behavior DB)

FIG. 5 depicts an example of the IT system attack behavior DB 220. The IT system attack behavior DB 220 is configured with one or more records each having columns including an attack behavior ID 2001 that is an identifier allocated to the general unauthorized access information, and a behavior content 2002 that is a content of the general unauthorized access information indicated by the attack behavior ID 2001.

With reference back to FIG. 2, the vehicle unauthorized access characteristic information generation section 213 generates vehicle unauthorized access characteristic information that is information about characteristics of the unauthorized access to the vehicle 20 in a case of comparing the unauthorized accesses to the vehicle 20 with an unauthorized access to the information processing apparatus.

Specifically, the vehicle unauthorized access characteristic information generation section 213 generates the vehicle unauthorized access characteristic information by identifying a dissimilarity between the vehicle characteristic information (automotive characteristic DB 250) and the general apparatus characteristic information (IT system characteristic DB 240).

Moreover, the vehicle unauthorized access characteristic information generation section 213 generates, as the vehicle unauthorized access characteristic information, information about at least any of items of viewpoint (hereinafter, also referred to as "viewpoint" or "viewpoints") including a subject of the unauthorized access to the vehicle 20, an object subjected to the unauthorized access, a method of the unauthorized access, an unauthorized access count or frequency, and timing of the unauthorized access. In other words, the vehicle unauthorized access characteristic information generation section 213 generates information about each of items of so-called "5W2H" (Who=subject, Where=location, What=object (purpose), When=time or case, Why=reason, How=manner or method, How many=frequency or count). The vehicle unauthorized access characteristic information is generated for each of these viewpoints (5W2H).

For example, the vehicle unauthorized access characteristic information generation section 213 generates, as the vehicle unauthorized access characteristic information, information about an item of viewpoint while assuming the object subjected to the unauthorized access as a plurality of vehicles 20 with the same configuration.

Furthermore, the vehicle unauthorized access characteristic information generation section 213 classifies the vehicle unauthorized access characteristic information into information about the unauthorized access in any of a first phase for determining the object subjected to the unauthorized access, a second phase for transmitting data to the object subjected to the unauthorized access, and a third phase for causing the object subjected to the unauthorized access to perform a predetermined process. In other words, the vehicle unauthorized access characteristic information generation section 213 classifies each vehicle unauthorized access characteristic information into any of a lock-on phase (first phase), an intrusion phase (second phase), and a purpose carrying-out phase (third phase). The vehicle unauthorized access characteristic information belongs to any of these phases.

The vehicle unauthorized access characteristic information is stored in an automotive behavior element DB 260.

(Automotive Behavior Element DB)

FIG. 6 depicts an example of the automotive behavior element DB 260. The automotive behavior element DB 260 is configured with one or more records each having columns including: an element ID 2401 that is a predetermined identifier; a comparison item 2402 in which information about an item corresponding to the item 2202 in the IT system characteristic DB 240 and the item 2302 in the automotive characteristic DB 250 is stored; a behavior element 2403 in which information corresponding to the comparison item 2402 and indicating the characteristics of the unauthorized access to the vehicle 20 (hereinafter, referred to as "behavior element") is stored; an attack phase 2404 in which information indicating the phase of the unauthorized access to the vehicle 20 is stored; a 5W element 2405 in which information about the viewpoint of the unauthorized access to the vehicle 20 is stored; a before-change content 2406 in which information belonging to the phase indicated by the attack phase 2404 and indicating the characteristics of the unauthorized access to the information processing apparatus (hereinafter, referred to as "general unauthorized access characteristic information") in the viewpoint indicated by the 5W element 2405 is stored, and an after-change content 2407 in which information obtained by changing a part of the viewpoint indicated by the 5W element 2405 in the general unauthorized access characteristic information indicated by the before-change content 2406 to a viewpoint in the behavior element (vehicle unauthorized access characteristic information) is stored.

With reference back to FIG. 2, the vehicle unauthorized access information generation section 214 generates vehicle unauthorized access information that is information indicating a configuration of the unauthorized access to the vehicle 20 on the basis of the general unauthorized access information received by the general unauthorized access information receiving section 211 and the vehicle unauthorized access characteristic information generated by the vehicle unauthorized access characteristic information generation section 213.

Specifically, the vehicle unauthorized access information generation section 214 generates the vehicle unauthorized access information by replacing a part corresponding to the item of viewpoint in the general unauthorized access information received by the general unauthorized access information receiving section 211 by information about the item of viewpoint in the vehicle unauthorized access characteristic information generated by the vehicle unauthorized access characteristic information generation section 213.

For example, the vehicle unauthorized access information generation section 214 generates the vehicle unauthorized access information by replacing information about the item of viewpoint in a case of assuming the object subjected to the unauthorized access as one specific apparatus in the general unauthorized access information received by the general unauthorized access information receiving section 211 by information about the item of viewpoint (item of viewpoint in a case of assuming the object subjected to the unauthorized access as the plurality of vehicles 20 with the same configuration) in the vehicle unauthorized access characteristic information generated by the vehicle unauthorized access characteristic information generation section 213.

Furthermore, in a case in which the phase of the vehicle unauthorized access characteristic information classified by the vehicle unauthorized access characteristic information generation section 213 matches the phase of the general unauthorized access information received by the general unauthorized access information receiving section 211, the vehicle unauthorized access information generation section 214 generates the vehicle unauthorized access information in the matching phase.

The vehicle unauthorized access information is stored in an automotive attack behavior DB 230.

(Automotive attack behavior DB)

FIG. 7 depicts an example of the automotive attack behavior DB 230. The automotive attack behavior DB 230 is configured with one or more records each having columns including: an attack behavior ID 2101 that is an identifier allocated to vehicle unauthorized access information; and a behavior content 2102 that is a content of the vehicle unauthorized access information indicated by the attack behavior ID 2101.

With reference back to FIG. 2, the vehicle unauthorized access detection rule generation section 216 generates a vehicle unauthorized access detection rule that is information for detecting the unauthorized access to the vehicle 20 on the basis of the vehicle unauthorized access information generated by the vehicle unauthorized access information generation section 214.

Specifically, the vehicle unauthorized access detection rule generation section 216 combines the vehicle unauthorized access information generated by the vehicle unauthorized access information generation section 214 with the general unauthorized access information received by the general unauthorized access information receiving section 211, and generates the vehicle unauthorized access detection rule on the basis of the combined information.

The vehicle unauthorized access detection rule contains, for example, determination of a log (to-be-monitored vehicle log) for identifying a content of the unauthorized access when an attacker makes the unauthorized access to the vehicle 20 and setting of a threshold related to an access count thereof.

It is noted that the vehicle unauthorized access information is combined with the general unauthorized access information because of a probability of presence of an unauthorized access to a general IT system in addition to the unauthorized access specific to the vehicle 20.

The attack detection rule delivery section 217 delivers the vehicle unauthorized access detection rule generated by the vehicle unauthorized access detection rule generation section 216 to the automotive monitoring server 110.

The information output section 218 outputs a content of the general unauthorized access information received by the general unauthorized access information receiving section 211 and a content of the vehicle unauthorized access information generated by the vehicle unauthorized access information generation section 214.

Details of the automotive monitoring server 110 will next be described.

<Automotive Monitoring Server>

Figure 8:
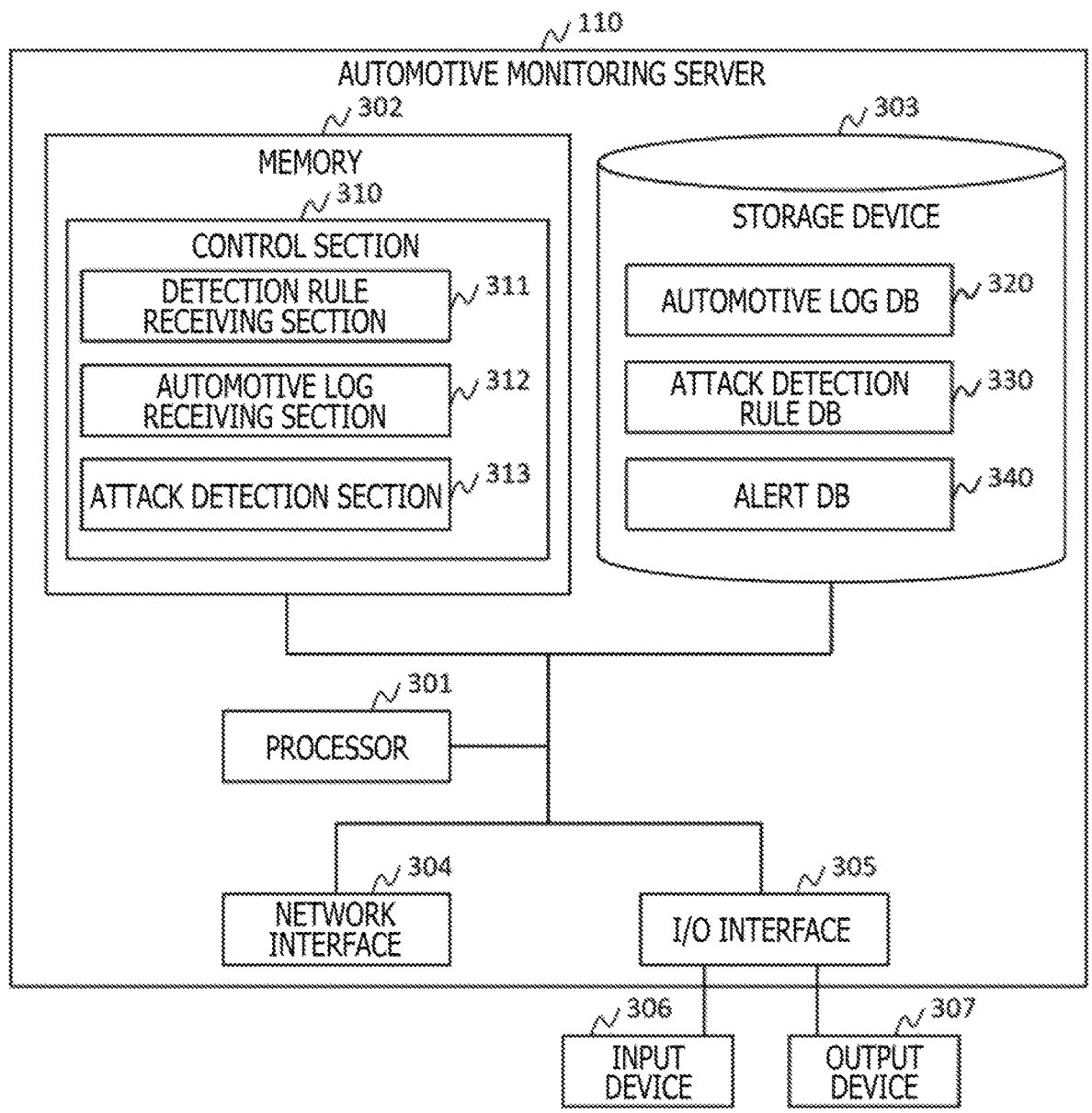
FIG. 8 depicts an example of hardware and functions provided in an automotive monitoring server.

FIG. 8 depicts an example of hardware and functions provided in the automotive monitoring server 110.

The automotive monitoring server 110 is configured with, as hardware, a processor 301 such as a central processing unit CPU (CPU), a memory 302 such as a random access memory (RAM) or a read only memory (ROM), a storage device 303 such as an hard disk drive (HDD) or an solid state drive (SSD), a network interface 304, and an input/output (I/O) interface 305 that is an interface for connecting the automotive monitoring server 110 to external devices such as input devices 306 and output devices 307 to be described later, and these constituent elements are connected to one another via a bus or the like that is not depicted. Furthermore, the input devices 306 such as a keyboard, a mouse, and a touch panel and the output devices 307 such as a display and a touch panel are connected to the automotive monitoring server 110.

The automotive monitoring server 110 also includes a control section 310 that controls the automotive monitoring server 110, a detection rule receiving section 311, an automotive log receiving section 312, and an attack detection section 313.

The detection rule receiving section 311 receives the vehicle unauthorized access detection rule from the attack detection rule generation server 100 and stores the received vehicle unauthorized access detection rule in an attack detection rule DB 330.

The automotive log receiving section 312 stores a log related to the unauthorized access to the vehicle 20 (hereinafter, referred to as "automotive log") and transmitted from the vehicle 20 in an automotive log DB 320. It is noted that because of a probability that the automotive log is transmitted from a plurality of communication paths, an automotive log transmission order often differs from an automotive log receiving order. Owing to this, the automotive log receiving section 312 reorders the automotive log in an automotive log generation order by reading a time stamp recorded within the automotive log at a time of storing the automotive log.

The attack detection section 313 detects the unauthorized access to the vehicle 20 by applying the automotive log stored in the automotive log DB 320 to the vehicle unauthorized access detection rule stored in the attack detection rule DB 330. It is noted that in a case of detecting the unauthorized access to the vehicle 20, the attack detection section 313 generates a predetermined alert and stores the generated alert in an alert DB 340.

The functions of each information processing apparatus described so far are realized by either the hardware of the information processing apparatus or by causing the processor in the information processing apparatus to read and execute a program stored in the memory or the storage device.

Furthermore, these programs are stored, for example, in a storage device such as a secondary storage device, a non-volatile semiconductor memory, a hard disk drive, or an SSD, or in a non-transitory storage medium such as an IC card, an SD card, or a DVD readable by an information processing apparatus.

<<Process>>

A process performed by the automotive attack detection system 1 will next be described.

<Outline of Process>

Figure 9:
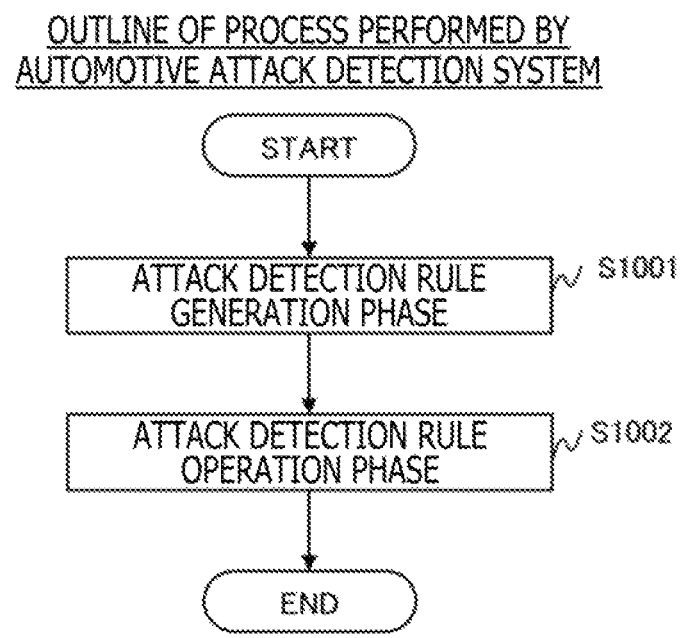
FIG. 9 is an explanatory diagram of an outline of a process performed by the automotive attack detection system.

First, FIG. 9 is an explanatory diagram of an outline of the process performed by the automotive attack detection system 1. The process performed by the automotive attack detection system 1 includes an attack detection rule generation phase for generating the vehicle unauthorized access detection rule (S1001), and an attack detection rule operation phase for applying the generated vehicle unauthorized access detection rule to the vehicle 20 and detecting the unauthorized access to the vehicle 20 (S1002), and these phases are repeatedly executed.

<Attack Detection Rule Generation Phase>

Figure 10:
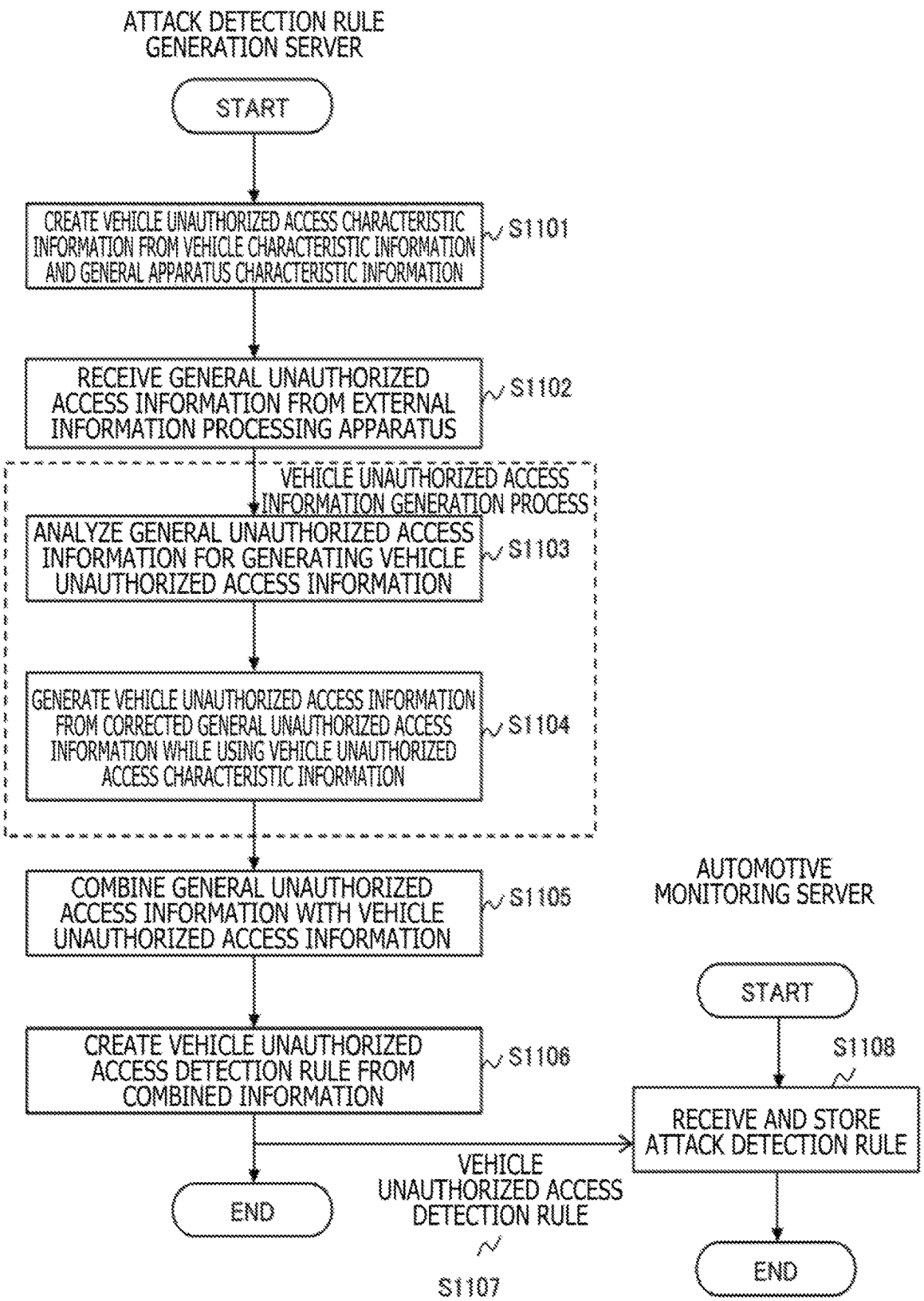
FIG. 10 is an explanatory flowchart of an example of an attack detection rule generation phase.

FIG. 10 is an explanatory flowchart of an example of the attack detection rule generation phase. The attack detection rule generation phase is started, for example, on an occasion of activating the attack detection rule generation server 100 or at predetermined timing (for example, at predetermined time or at predetermined time intervals).

First, the vehicle unauthorized access characteristic information generation section 213 in the attack detection rule generation server 100 generates the vehicle unauthorized access characteristic information on the basis of the general apparatus characteristic information and the vehicle characteristic information (S1101). The vehicle unauthorized access characteristic information generation section 213 performs, for example, the following process.

First, the vehicle unauthorized access characteristic information generation section 213 identifies a category and an item common to the general apparatus characteristic information and the vehicle characteristic information. Specifically, the vehicle unauthorized access characteristic information generation section 213 identifies the records in the automotive behavior element DB 250 and the IT system characteristic DB 240 in each of which a content of the category 2301 and a content of the item 2302 in the automotive characteristic DB 250 and a content of the category 2201 and a content of the item 2202 in the IT system characteristic DB 240 are in common, and stores the content of the item 2202 (or item 2302) in each record in the comparison item 2402 in the automotive behavior element DB 260.

The vehicle unauthorized access characteristic information generation section 213 generates information about the behavior element corresponding to the common category and the common item. Specifically, the vehicle unauthorized access characteristic information generation section 213 accepts, for example, an input of the information about the behavior element from the manager or the like and stores the accepted information about the behavior element in the behavior element 2403.

It is noted that the vehicle unauthorized access characteristic information generation section 213 may automatically generate the information about the behavior element. For example, the vehicle unauthorized access characteristic information generation section 213 acquires the characteristic 2303 in the record in the automotive characteristic DB 250 and the characteristic 2203 in the record in the IT system characteristic DB 240, and stores predetermined information corresponding to the acquired characteristics 2203 and 2303 in the behavior element 2403.

For example, in a case in which the common category is "difference in system" and the common item is "mobility," the characteristics corresponding to the category and the item are "mobile" and "fixed." In addition, information such as "change of target by physical movement" made to correspond to these characteristics in advance is stored in the behavior element 2403. In other words, a subject of the unauthorized access is often fixed without a physical movement since a cyber attack on the IT system is scanning or the like by way of a network. On the other hand, a subject of the unauthorized access to the automobile often makes a physical movement and changes an object subjected to the unauthorized access one after another since a cyber attack on the automobile makes use of a vehicle to vehicle communication.

Moreover, in a case, for example, in which the common category is "difference in object" and the common item is "large number of objects to be monitored," characteristics corresponding to the category and the item are "one specific object" and "a plurality of objects with same configuration." In addition, information such as "attack on a plurality of vehicles with same configuration" made to correspond to these characteristics is stored in the behavior element 2403. In other words, while the cyber attack on the IT system is often carried out on one specific computer (apparatus), the cyber attack on the automobile is often carried out on a plurality of automobiles with the same configuration as objects to be attacked by repeatedly performing an identical authentication process.

Next, the vehicle unauthorized access characteristic information generation section 213 identifies the phase of the behavior element. Specifically, the vehicle unauthorized access characteristic information generation section 213 accepts, for example, an input of the phase of the behavior element from the manager and stores the accepted phase in the attack phase 2404 in the automotive behavior element DB 260.

It is noted that the vehicle unauthorized access characteristic information generation section 213 may automatically generate information about the phase of the behavior element. For example, the vehicle unauthorized access characteristic information generation section 213 identifies the phase by performing a morphological analysis or the like on text in the behavior element 2403, and stores the identified phase in the attack phase 2404 in the automotive behavior element DB 260.

Next, the vehicle unauthorized access characteristic information generation section 213 identifies all viewpoints owned by the behavior element. Specifically, the vehicle unauthorized access characteristic information generation section 213 identifies each viewpoint by, for example, performing the morphological analysis or the like on the text in the behavior element 2403, and stores each identified viewpoint in the 5W element 2405 in the automotive behavior element DB 260. It is noted that in a case of presence of a plurality of viewpoints, records as many as the viewpoints may be created. Furthermore, the vehicle unauthorized access characteristic information generation section 213 may accept an input of the viewpoints owned by the behavior element from the manager and store the accepted viewpoints in the 5W element 2405 in the automotive behavior element DB 260.

Moreover, the vehicle unauthorized access characteristic information generation section 213 generates the general unauthorized access element information. Specifically, the vehicle unauthorized access characteristic information generation section 213 accepts, for example, an input of the general unauthorized access element information from the manager or the like and stores an accepted content in the before-change content 2406.

It is noted that the vehicle unauthorized access characteristic information generation section 213 may generate the general unauthorized access characteristic information on the basis of a predetermined database (for example, technical information related to the unauthorized access to the information processing apparatus or information recording a case). For example, the vehicle unauthorized access characteristic information generation section 213 extracts a character string such as keywords, phrases, or compositions for which a degree of correlation to the behavior element 2403 is equal to or higher than a predetermined threshold, inquires the manager about whether the extracted character string is used as the general unauthorized access characteristic information, and stores the character string in the before-change content 2406 in a case in which the extracted character string is used as the general unauthorized access characteristic information.

Next, the vehicle unauthorized access characteristic information generation section 213 generates the vehicle unauthorized access characteristic information. Specifically, the vehicle unauthorized access characteristic information generation section 213 accepts, for example, an input of the vehicle unauthorized access characteristic information from the manager and stores an accepted content in the after-change content 2407.

It is noted that the vehicle unauthorized access characteristic information generation section 213 may generate the vehicle unauthorized access characteristic information on the basis of a predetermined database (for example, technical information related to the unauthorized access to the information processing apparatus and the unauthorized access to the vehicle or information recording a case). For example, the vehicle unauthorized access characteristic information generation section 213 extracts from the predetermined database a character string such as keywords, phrases, or compositions for which a degree of correlation to the before-change content 2406 is equal to or higher than a predetermined threshold, inquires the manager about whether the extracted character string is used as the vehicle unauthorized access characteristic information, and stores the character string in the after-change content 2407 in a case in which the extracted character string is used as the vehicle unauthorized access characteristic information.

Next, the general unauthorized access information receiving section 211 receives the general unauthorized access information from the external information processing apparatus 30 and stores the received general unauthorized access information in the IT system attack behavior DB 220 (S1102).

The vehicle unauthorized access characteristic information generation section 213 performs a predetermined analysis on the received general unauthorized access information (S1103), and generates the vehicle unauthorized access information from the general unauthorized access information analyzed in S1103, on the basis of the vehicle unauthorized access characteristic information generated in S1101 (S1104). Details of a process in S1103 and S1104 (hereinafter, referred to as "vehicle unauthorized access information generation process") will be described later.

The vehicle unauthorized access detection rule generation section 216 combines the general unauthorized access information received in S1102 with the vehicle unauthorized access information generated in S1104 (S1105).

The vehicle unauthorized access detection rule generation section 216 creates the vehicle unauthorized access detection rule on the basis of the information combined in S1105 (S1106).

The attack detection rule delivery section 217 delivers the vehicle unauthorized access detection rule generated in S1106 to the automotive monitoring server 110 (S1107). The detection rule receiving section 311 in the automotive monitoring server 110 then stores the received vehicle unauthorized access detection rule in the attack detection rule DB 330 (S1108). The attack detection rule generation phase is thus ended.

(Attack Detection Rule DB)

Here, FIG. 11 depicts an example of the attack detection rule DB 330. The attack detection rule DB 330 is configured with one or more records each having columns including: a rule ID 2601 in which an identifier of the vehicle unauthorized access detection rule is stored; a rule content 2602 in which a content of the vehicle unauthorized access detection rule is stored; and a threshold 2603 in which a lowest frequency of detection under the vehicle unauthorized access detection rule is stored.

The attack detection rule operation phase will next be described.

<Attack Detection Rule Operation Phase>

Figure 12:
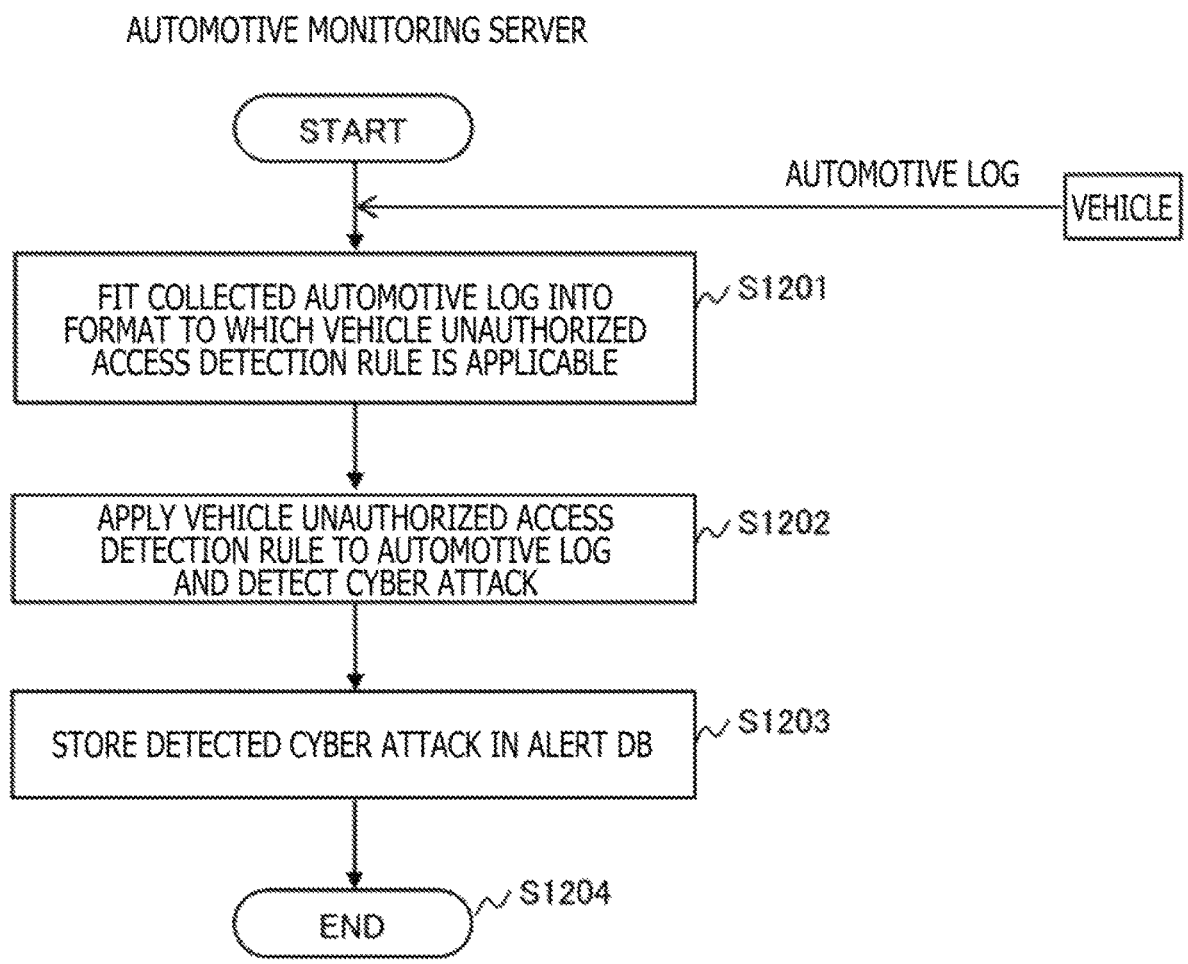
FIG. 12 is an explanatory flowchart of an example of an attack detection rule operation phase.

FIG. 12 is an explanatory flowchart of an example of the attack detection rule operation phase. This process is started, for example, at predetermined timing (for example, at predetermined time intervals or at predetermined time).

First, the vehicle 20 transmits the automotive log to the automotive monitoring server 110, and the automotive log receiving section 312 in the automotive monitoring server 110 stores the received automotive log in the automotive log DB 320 (S1201).

The attack detection section 313 applies the vehicle unauthorized access detection rule to the received automotive log and detects a cyber attack on the vehicle 20 (S1202). The attack detection section 313 generates predetermined alert information when detecting the cyber attack on the vehicle 20, and stores the generated alert information in the alert DB 340 (S1203). The attack detection rule operation phase is thus ended (S1204).

(Automotive Log DB)

Here, FIG. 13 depicts an example of the automotive log DB 320. The automotive log DB 320 includes one or more records each having columns including: a time stamp 2501 in which information about a date or time is stored; and detailed log information 2502 in which a content of the unauthorized access made to the vehicle 20 is stored.

(Alert DB)

Next, FIG. 14 depicts an example of the alert DB 340. The alert DB 340 has one or more records each having columns including: an alert ID 2701 in which an identifier of the alert is stored, occurrence time 2702 in which a date or time at which the alert is generated is stored, and an alert content 2703 in which a content of the generated alert is stored.

Details of the vehicle unauthorized access information generation process in the attack detection rule generation phase will next be described.

<Vehicle Unauthorized Access Information Generation Process>

Figure 15:
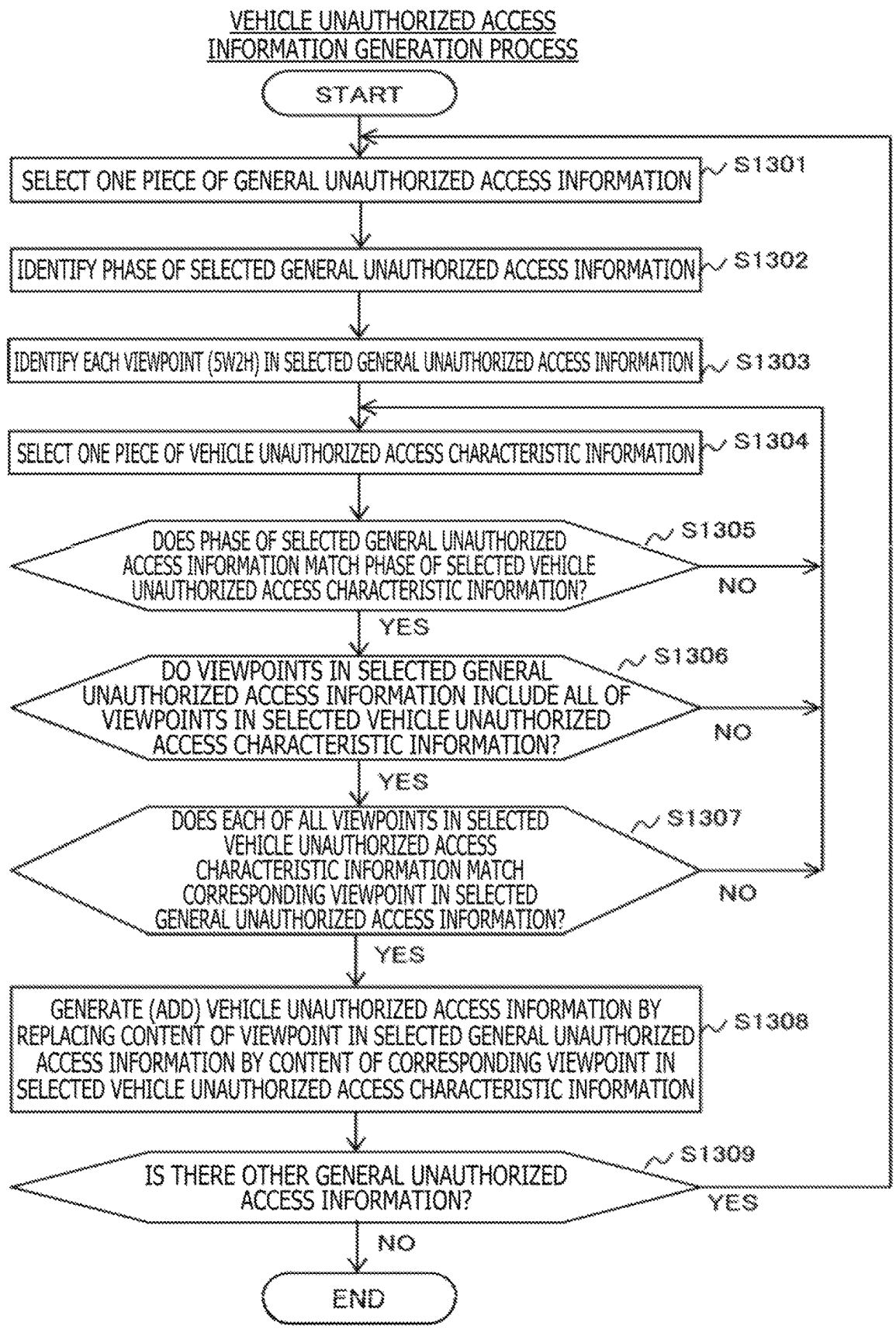
FIG. 15 is an explanatory flowchart of an example of a vehicle unauthorized access information generation process.

FIG. 15 is an explanatory flowchart of an example of the vehicle unauthorized access information generation process.

First, the vehicle unauthorized access information generation section 214 in the attack detection rule generation server 100 selects one piece of general unauthorized access information (S1301). Specifically, the vehicle unauthorized access information generation section 214 selects, for example, one record from the IT system attack behavior DB 220.

The vehicle unauthorized access information generation section 214 analyzes the general unauthorized access information selected in S1301 (hereinafter, referred to as "selected general unauthorized access information") and identifies the phase thereof (S1302). Specifically, the vehicle unauthorized access information generation section 214 performs, for example, a morphological analysis or the like on text in the selected general unauthorized access information, thereby classifying the selected general unauthorized access information into any of the lock-on phase, the intrusion phase, and the purpose carrying-out phase.

Furthermore, the vehicle unauthorized access information generation section 214 analyzes the selected general unauthorized access information and identifies a part related to each viewpoint (5W2H) in the information (S1303). Specifically, the vehicle unauthorized access information generation section 214 breaks down the text in the behavior content 2002 of the record selected in S1301 into a plurality of phrases, passages, compositions, or the like by performing the morphological analysis or the like, thereby identifying a part related to each viewpoint in the text.

The vehicle unauthorized access information generation section 214 selects one piece of vehicle unauthorized access characteristic information generated in S1101 (S1304). Specifically, the vehicle unauthorized access information generation section 214 in the attack detection rule generation server 100 selects, for example, one record from the automotive behavior element DB 260.

The vehicle unauthorized access information generation section 214 determines whether the phase of the selected general unauthorized access information identified in S1302 matches the phase of the vehicle unauthorized access characteristic information selected in S1304 (hereinafter, referred to as "selected vehicle unauthorized access characteristic information") selected in S1304 (S1305). Specifically, the vehicle unauthorized access information generation section 214 determines, for example, whether a content of the attack phase 2404 of the record selected in S1304 matches the phase determined in S1302.

In a case in which the phase of the selected general unauthorized access information matches that of the selected vehicle unauthorized access characteristic information (S1305: YES), the vehicle unauthorized access information generation section 214 performs a process in S1306. In a case in which the phase of the selected general unauthorized access information does not match that of the selected vehicle unauthorized access characteristic information (S1305: NO), the vehicle unauthorized access information generation section 214 performs a process in S1304 to select new vehicle unauthorized access characteristic information.

In S1306, the vehicle unauthorized access information generation section 214 determines whether viewpoints in the selected general unauthorized access information include all viewpoints in the selected vehicle unauthorized access characteristic information (S1306). Specifically, the vehicle unauthorized access information generation section 214 determines, for example, whether the viewpoints identified in S1303 include all the viewpoints indicated by the 5W element 2405 of the record selected in S1304.

In a case in which the viewpoints in the selected general unauthorized access information include all the viewpoints in the selected vehicle unauthorized access characteristic information (S1306: YES), the vehicle unauthorized access information generation section 214 performs a process in S1307. In a case in which the viewpoints in the selected general unauthorized access information do not include all the viewpoints in the selected vehicle unauthorized access characteristic information (S1306: NO), the vehicle unauthorized access information generation section 214 performs the process in S1304 to select other vehicle unauthorized access characteristic information.

In S1307, the vehicle unauthorized access information generation section 214 determines whether a content of each viewpoint owned by the selected vehicle unauthorized access characteristic information matches a content of each corresponding viewpoint in the selected general unauthorized access information. Specifically, the vehicle unauthorized access information generation section 214 determines, for example, whether text in the before-change content 2406 corresponding to the 5W element 2405 of the record selected in S1304 in the automotive behavior element DB 260 matches text of a part related to the viewpoint in the behavior content 2002 identified in S1303 for each viewpoint of the 5W element 2405.

In a case in which the content of each viewpoint owned by the selected vehicle unauthorized access characteristic information matches the content of the corresponding viewpoint in the selected general unauthorized access information (S1307: YES), the vehicle unauthorized access information generation section 214 performs a process in S1308. In a case in which the content of each viewpoint owned the selected vehicle unauthorized access characteristic information does not completely match the content of the corresponding viewpoint in the selected general unauthorized access information (S1307: NO), the vehicle unauthorized access information generation section 214 performs the process in S1304 to select other vehicle unauthorized access characteristic information.

In S1308, the vehicle unauthorized access information generation section 214 generates (adds) vehicle unauthorized access information by replacing a part related to each viewpoint of the selected general unauthorized access information by a part related to the corresponding viewpoint of the selected vehicle unauthorized access characteristic information. Specifically, the vehicle unauthorized access information generation section 214 generates, for example, a new record in the automotive attack behavior DB 230. In addition, the vehicle unauthorized access information generation section 214 generates data by replacing a part related to each viewpoint of the 5W element 2405 selected in S1304 in the automotive behavior element DB 260 in the behavior content 2002 selected in S1301 in the IT system attack behavior DB 220 by the after-change content 2407 (that is, data obtained by replacing part of the behavior content 2002), and stores the generated data in the behavior content 2102 of the generated record.

The vehicle unauthorized access information generation section 214 determines whether other unselected general unauthorized access information is present (S1309). In a case in which the other unselected general unauthorized access information is present (S1309: YES), the vehicle unauthorized access information generation section 214 executes a process in S1301 to select the general unauthorized access information. On the other hand, in a case in which the other unselected general unauthorized access information is not present (S1309: NO), the vehicle unauthorized access information generation process is ended.

<Automotive Attack Behavior Display Screen>

Figure 16:
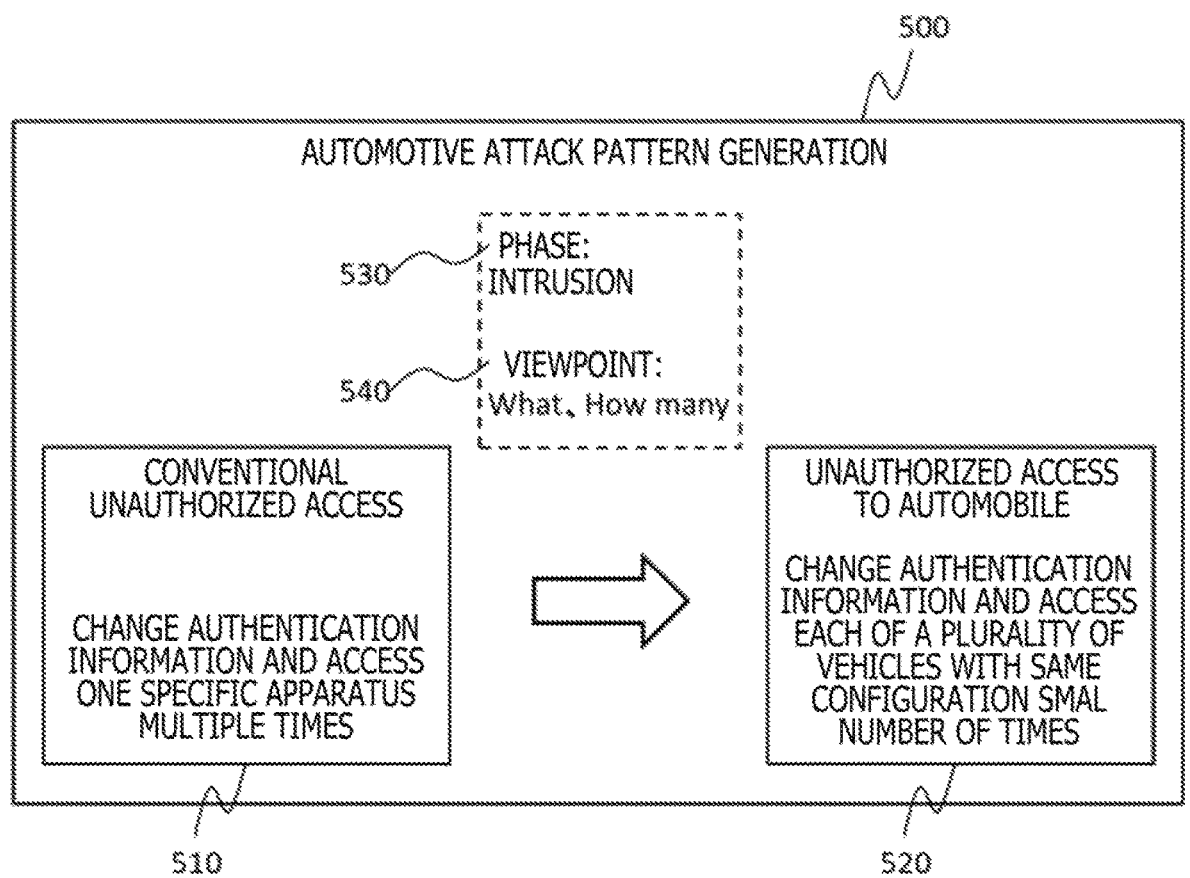
FIG. 16 depicts an example of an automotive attack behavior display screen.

FIG. 16 depicts an example of a screen displayed by the attack detection rule generation server 100 or the automotive monitoring server 110 for displaying the generated information about the vehicle unauthorized access (hereinafter, referred to as "automotive attack behavior display screen"). On an automotive attack behavior display screen 500, a first display box 510 on which a content of a conventional unauthorized access to the information processing apparatus (general unauthorized access information) is displayed, and a second display box 520 on which a content of the unauthorized access to the vehicle 20 (vehicle unauthorized access information) derived from the conventional unauthorized access displayed on the first display box 510 is displayed are provided. In addition, on the automotive attack behavior display screen 500, a third display box 530 on which the phase to which the general unauthorized access information and the vehicle unauthorized access information belong is displayed, and a fourth display box 540 on which viewpoints used at a time of generating the vehicle unauthorized access information from the general unauthorized access information are displayed are provided.

As described so far, the vehicle unauthorized access countermeasure taking apparatus (attack detection rule generation server 100) in the automotive attack detection system 1 according to the present embodiment generates vehicle unauthorized access information that is information about a configuration of an unauthorized access to the vehicle 20 on the basis of general unauthorized access information that is information about an unauthorized access made to a predetermined information processing apparatus and of vehicle unauthorized access characteristic information that is information about characteristics of the unauthorized access to the vehicle 20 in a case of comparing the unauthorized access to the vehicle 20 with the unauthorized access to the information processing apparatus, and thereby generates a vehicle unauthorized access detection rule that is information for detecting the unauthorized access to the vehicle 20. In other words, the attack detection rule generation server 100 can generate the rule for detecting the unauthorized access to the vehicle 20 from the characteristics of the unauthorized access to the vehicle 20 while making use of the information about the general unauthorized access to the information processing apparatus. Therefore, even in a situation in which the attack detection rule generation server 100 is unable to obtain knowledge about the unauthorized access to the vehicle 20, the attack detection rule generation server 100 can appropriately detect the unauthorized access to the vehicle 20 on the basis of the general unauthorized access information.

In this way, the vehicle unauthorized access countermeasure taking apparatus according to the present embodiment can accurately detect the unauthorized access to the vehicle 20. The vehicle unauthorized access countermeasure taking apparatus can detect a cyber attack on the vehicle 20 in real time particularly while making use of the knowledge about cyber attacks on general IT systems accumulated in large volumes.

The above description of the embodiment is given to facilitate understanding of the present invention and does not intend to limit the present invention. Changes and modifications can be made of the present invention without departure from the purport of the present invention and the present invention includes equivalences thereof.

For example, while the present embodiment has been described on the premise that the vehicle 20 is the passenger vehicle, the present invention is also applicable to an automobile in general such as a truck. Furthermore, the present invention is applicable to not only the automobile but also a vehicle in general making use of a predetermined program in relation to traveling or actions.

Moreover, the attack detection rule generation server 100 generates the vehicle unauthorized access information on the basis of all the viewpoints registered in the automotive behavior element DB 260 at the time of generating the automotive attack behavior DB 230 (vehicle unauthorized access information) from the automotive behavior element DB 260 in the present embodiment. Alternatively, the attack detection rule generation server 100 may accept an input of viewpoints to be used from the manager and generate vehicle unauthorized access information only about the viewpoints the input of which is accepted. Likewise, the attack detection rule generation server 100 may accept an input of phases to be used from the manager.

Moreover, it has been described in the present embodiment that the attack detection rule generation server 100, the automotive monitoring server 110, and the external information processing apparatus 30 are separate information processing apparatuses. Alternatively, part or all the attack detection rule generation server 100, the automotive monitoring server 110, and the external information processing apparatus 30 may be integrated as one information processing apparatus.

At least the following respects are made clear from the description of the present specification given so far. In other words, the vehicle unauthorized access countermeasure taking apparatus according to the present embodiment may include: a vehicle characteristic information storage section that stores vehicle characteristic information which is information indicating characteristics of the vehicle 20; and a general apparatus characteristic information storage section that stores general apparatus characteristic information which is information indicating characteristics of the information processing apparatus, and the vehicle unauthorized access characteristic information generation section may generate the vehicle unauthorized access characteristic information by identifying a dissimilarity between the vehicle characteristic information and the general apparatus characteristic information.

In this way, generating the vehicle unauthorized access characteristic information by identifying the dissimilarity between the vehicle characteristic information that is the information indicating the characteristics of the vehicle 20 and the general apparatus characteristic information that is the information indicating the characteristics of the information processing apparatus makes it possible to accurately extract characteristics owned by the unauthorized access to the vehicle 20.

Furthermore, in the vehicle unauthorized access countermeasure taking apparatus according to the present embodiment, the vehicle unauthorized access characteristic information generation section may generate, as the vehicle unauthorized access characteristic information, information about at least any of items of viewpoint including a subject of the unauthorized access, an object subjected to the unauthorized access, a method of the unauthorized access, an unauthorized access count or frequency, and timing of the unauthorized access, and the vehicle unauthorized access information generation section may generate the vehicle unauthorized access information by replacing a part corresponding to one of the items of viewpoint in the received general unauthorized access information by the generated information about the one of the items of viewpoint in the vehicle unauthorized access characteristic information.

In this way, generating the vehicle unauthorized access characteristic information by generating the vehicle unauthorized access characteristic information from the so-called 5W2H viewpoints and replacing the general unauthorized access information by these pieces of information makes it possible to accurately detect the unauthorized access to the vehicle 20.

Moreover, in the vehicle unauthorized access countermeasure taking apparatus according to the present embodiment, the vehicle unauthorized access characteristic information generation section may generate, as the vehicle unauthorized access characteristic information, information about one of the items of viewpoint while assuming the object subjected to the unauthorized access as a plurality of vehicles with a same configuration, and the vehicle unauthorized access information generation section may generate the vehicle unauthorized access information by replacing information about an item of viewpoint in a case of assuming the object subjected to the unauthorized access as one specific apparatus in the received general unauthorized access information, the item corresponding to the one of the items of viewpoint, by the generated information about the one of the items of viewpoint in the vehicle unauthorized access characteristic information.

In this way, replacing such a conspicuous characteristic part regarding the general unauthorized access, that the object subjected to the unauthorized access is assumed as one specific apparatus, by such a conspicuous characteristic part regarding the unauthorized access to the vehicle, that the object subjected to the unauthorized access is a plurality of vehicles with the same configuration, makes it possible to reliably detect the unauthorized access to the vehicle 20.

Furthermore, in the vehicle unauthorized access countermeasure taking apparatus according to the present embodiment, the vehicle unauthorized access characteristic information generation section may classify the vehicle unauthorized access characteristic information into information about the unauthorized access in any of a first phase for determining the object subjected to the unauthorized access, a second phase for transmitting data to the object subjected to the unauthorized access, and a third phase for causing the object subjected to the unauthorized access to perform a predetermined process, and in a case in which the phase of the classified vehicle unauthorized access characteristic information matches a phase of the received general unauthorized access information, the vehicle unauthorized access information generation section may generate vehicle unauthorized access information in the matching phase.

In this way, forming the vehicle unauthorized access information to the information corresponding to any of a determination stage of the object subjected to the unauthorized access, an intrusion stage to the unauthorized access, and a purpose carrying-out stage for causing the object subjected to the unauthorized access to perform a predetermined process makes it possible to detect the unauthorized access to the vehicle 20 at earlier timing.

Moreover, in the vehicle unauthorized access countermeasure taking apparatus according to the present embodiment, the vehicle unauthorized access detection rule generation section may combine the generated vehicle unauthorized access information with the received general unauthorized access information and generate the vehicle unauthorized access detection rule on the basis of the combined information.

In this way, generating the vehicle unauthorized access detection rule obtained by combining the vehicle unauthorized access information with the general unauthorized access information makes it possible to detect the unauthorized access to the vehicle 20 even in a case of incorporating not only programs unique to the vehicle but also programs related to a general IT system into the vehicle 20.

Furthermore, the vehicle unauthorized access countermeasure taking apparatus according to the present embodiment may include an information output section that outputs a content of the received general unauthorized access information and a content of the generated vehicle unauthorized access information.

In this way, outputting the content of the general unauthorized access information and the content of the generated vehicle unauthorized access information enables the manager to grasp the dissimilarity between the unauthorized access to the vehicle 20 and the general unauthorized access.

What is claimed is:

1. A vehicle unauthorized access countermeasure taking apparatus for detecting an unauthorized access to a vehicle comprising:
    a processor;
    a general unauthorized access information receiving section that receives, from an external terminal, general unauthorized access information that is information about a previous unauthorized access made to an external processor;
    a vehicle unauthorized access characteristic information generation section that generates vehicle unauthorized access characteristic information that is information about characteristics of an unauthorized access to the vehicle by comparing the unauthorized access to the vehicle with the unauthorized access to the external processor, wherein the vehicle unauthorized access characteristic information generation section classifies the vehicle unauthorized access characteristic information into information about the unauthorized access in any of a first phase for determining an object subjected to the unauthorized access, a second phase for transmitting data to the object subjected to the unauthorized access, and a third phase for causing the object subjected to the unauthorized access to perform a predetermined process, wherein in a case in which a phase of the classified vehicle unauthorized access characteristic information matches a phase of the received general unauthorized access information, the vehicle unauthorized access information generation section generates vehicle unauthorized access information in a matching phase;
    a vehicle unauthorized access information generation section that generates vehicle unauthorized access information that is information indicating a configuration of the unauthorized access to the vehicle on a basis of the received general unauthorized access information and the generated vehicle unauthorized access characteristic information; and
    a vehicle unauthorized access detection rule generation section that generates a vehicle unauthorized access detection rule that is information for detecting the unauthorized access to the vehicle on the basis of the generated vehicle unauthorized access information.

2. The vehicle unauthorized access countermeasure taking apparatus according to claim 1, further comprising:
    a vehicle characteristic information storage section that stores vehicle characteristic information that is information indicating characteristics of the vehicle; and a general apparatus characteristic information storage section that stores general apparatus characteristic information that is information indicating characteristics of the external processor, wherein the vehicle unauthorized access characteristic information generation section generates the vehicle unauthorized access characteristic information by identifying a dissimilarity between the vehicle characteristic information and the general apparatus characteristic information.

3. The vehicle unauthorized access countermeasure taking apparatus according to claim 1, wherein the vehicle unauthorized access characteristic information generation section generates, as the vehicle unauthorized access characteristic information, information about at least any of items of viewpoint including a subject of the unauthorized access, an object subjected to the unauthorized access, a method of the unauthorized access, an unauthorized access count or frequency, and timing of the unauthorized access, and the vehicle unauthorized access information generation section generates the vehicle unauthorized access information by replacing a part corresponding to one of the items of viewpoint in the received general unauthorized access information by the generated information about the one of the items of viewpoint in the vehicle unauthorized access characteristic information.

4. The vehicle unauthorized access countermeasure taking apparatus according to claim 3, wherein the vehicle unauthorized access characteristic information generation section generates, as the vehicle unauthorized access characteristic information, information about one of the items of viewpoint while assuming the object subjected to the unauthorized access as a plurality of vehicles with a same configuration, and the vehicle unauthorized access information generation section generates the vehicle unauthorized access information by replacing information about an item of viewpoint in a case of assuming the object subjected to the unauthorized access as one specific apparatus in the received general unauthorized access information, the item corresponding to the one of the items of viewpoint, by the generated information about the one of the items of viewpoint in the vehicle unauthorized access characteristic information.

5. The vehicle unauthorized access countermeasure taking apparatus according to claim 1, wherein the vehicle unauthorized access detection rule generation section combines the generated vehicle unauthorized access information with the received general unauthorized access information and generates the vehicle unauthorized access detection rule on a basis of combined information.

6. The vehicle unauthorized access countermeasure taking apparatus according to claim 1, further comprising an information output section that outputs a content of the received general unauthorized access information and a content of the generated vehicle unauthorized access information.

7. A vehicle unauthorized access countermeasure taking method executed by a vehicle unauthorized access countermeasure taking apparatus, comprising:

receiving, from an external terminal, general unauthorized access information that is information about a previous unauthorized access made to an external processor;

generating vehicle unauthorized access characteristic information that is information about characteristics of an unauthorized access to a vehicle by comparing the unauthorized access to the vehicle with the unauthorized access to the external processor;

classifying the vehicle unauthorized access characteristic information into information about the unauthorized access in any of a first phase for determining an object subjected to the unauthorized access, a second phase for transmitting data to the object subjected to the unauthorized access, and a third phase for causing the object subjected to the unauthorized access to perform a predetermined process;

generating, in cases in which a phase of the classified vehicle unauthorized access characteristic information matches a phase of the received general unauthorized access information, vehicle unauthorized access information in a matching phase;

generating vehicle unauthorized access information that is information indicating a configuration of the unauthorized access to the vehicle on a basis of the received general unauthorized access information and the generated vehicle unauthorized access characteristic information; and generating a vehicle unauthorized access detection rule that is information for detecting the unauthorized access to the vehicle on the basis of the generated vehicle unauthorized access information.

8. The vehicle unauthorized access countermeasure taking method executed by the vehicle unauthorized access countermeasure taking apparatus, according to claim 7, the method further comprising:

a vehicle characteristic information storage process storing vehicle characteristic information that is information indicating characteristics of the vehicle; and a general apparatus characteristic information storage process storing general apparatus characteristic information that is information indicating characteristics of the external processor, wherein the vehicle unauthorized access countermeasure taking apparatus generates the vehicle unauthorized access characteristic information by identifying a dissimilarity between the vehicle characteristic information and the general apparatus characteristic information in the vehicle unauthorized access characteristic information generation process.

9. The vehicle unauthorized access countermeasure taking method according to claim 7, wherein the vehicle unauthorized access countermeasure taking apparatus generates, in the vehicle unauthorized access characteristic information generation process, as the vehicle unauthorized access characteristic information, information about at least any of items of viewpoint including a subject of the unauthorized access, an object subjected to the unauthorized access, a method of the unauthorized access, an unauthorized access count or frequency, and timing of the unauthorized access, and generates, in the vehicle unauthorized access information generation process, the vehicle unauthorized access information by replacing a part corresponding to one of the items of viewpoint in the received general unauthorized access information by the generated information about the one of the items of viewpoint in the vehicle unauthorized access characteristic information.

10. The vehicle unauthorized access countermeasure taking method according to claim 9, wherein the vehicle unauthorized access countermeasure taking apparatus
generates, in the vehicle unauthorized access characteristic information generation process, as the vehicle unauthorized access characteristic information, information about one of the items of viewpoint while assuming the object subjected to the unauthorized access as a plurality of vehicles with a same configuration, and
generates, in the vehicle unauthorized access information generation process, the vehicle unauthorized access information by replacing information about an item of viewpoint in a case of assuming the object subjected to the unauthorized access as one specific apparatus in the received general unauthorized access information, the item corresponding to the one of the items of viewpoint, by the generated information about the one of the items of viewpoint in the vehicle unauthorized access characteristic information.

11. The vehicle unauthorized access countermeasure taking method according to claim 7, wherein
the vehicle unauthorized access countermeasure taking apparatus
combines, in the vehicle unauthorized access detection rule generation process, the generated vehicle unauthorized access information with the received general unauthorized access information and generates the vehicle unauthorized access detection rule on a basis of the combined information.

12. The vehicle unauthorized access countermeasure taking method according to claim 7, wherein
the vehicle unauthorized access countermeasure taking apparatus
executes an information output process outputting a content of the received general unauthorized access information and a content of the generated vehicle unauthorized access information.

\* \* \* \* \*